(12) United States Patent
Donneau-Golencer et al.

(10) Patent No.: US 9,858,332 B1
(45) Date of Patent: Jan. 2, 2018

(54) EXTRACTING AND LEVERAGING KNOWLEDGE FROM UNSTRUCTURED DATA

(71) Applicant: SRI INTERNATIONAL, Menlo Park, CA (US)

(72) Inventors: Thierry Donneau-Golencer, Menlo Park, CA (US); Kenneth C. Nitz, Redwood City, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 0 days.

(21) Appl. No.: 15/006,946

(22) Filed: Jan. 26, 2016

Related U.S. Application Data

(63) Continuation of application No. 13/287,985, filed on Nov. 2, 2011, now Pat. No. 9,245,010.

(51) Int. Cl.
*G06F 7/00* (2006.01)
*G06F 17/30* (2006.01)

(52) U.S. Cl.
CPC .. *G06F 17/30598* (2013.01); *G06F 17/30312* (2013.01); *G06F 17/30424* (2013.01)

(58) Field of Classification Search
CPC . G06F 17/30; G06F 17/27; G06F 7/00; G06F 17/30598; G06F 17/30312; G06F 17/30424; G06F 17/30702; G06F 17/2785
See application file for complete search history.

(56) References Cited

U.S. PATENT DOCUMENTS

| | | |
|---|---|---|
| 5,664,109 A | 9/1997 | Johnson et al. |
| 6,411,924 B1* | 6/2002 | de Hita ............... G06F 17/271 704/9 |
| 6,738,767 B1 | 5/2004 | Chung et al. |
| 7,454,430 B1 | 11/2008 | Komissarchik et al. |
| 9,195,640 B1* | 11/2015 | Donneau-Golencer . G06F 17/28 |
| 2003/0101169 A1 | 5/2003 | Bhatt et al. |
| 2004/0249824 A1* | 12/2004 | Brockway ........... G06F 17/3061 |
| 2009/0070322 A1 | 3/2009 | Salvetti et al. |
| 2009/0259670 A1 | 10/2009 | Inmon |
| 2011/0161333 A1 | 6/2011 | Langseth et al. |
| 2012/0039539 A1* | 2/2012 | Boiman ............... G11B 27/28 382/195 |
| 2012/0046936 A1* | 2/2012 | Kandekar ............ G06Q 30/0282 704/9 |
| 2012/0102053 A1 | 4/2012 | Barrett et al. |
| 2012/0271884 A1 | 10/2012 | Holmes et al. |
| 2014/0046876 A1 | 2/2014 | Zhang et al. |

* cited by examiner

*Primary Examiner* — Azam Cheema
(74) *Attorney, Agent, or Firm* — Hickman Palermo Becker Bingham LLP

(57) ABSTRACT

A system may include a machine-implemented data extractor and correlator configured to retrieve data from at least one data source. The data extractor and correlator may extract information from unstructured data within the retrieved data and correlate the extracted information with previously stored structured data to generate additional structured data. The system may also include a storage device configured to store the previously stored structured data and the additional structured data.

24 Claims, 8 Drawing Sheets

EXTRACTING AND LEVERAGING KNOWLEDGE FROM UNSTRUCTURED DATA

CROSS-REFERENCE TO RELATED APPLICATION

This application is a continuation of U.S. patent application Ser. No. 13/287,985, filed Nov. 2, 2011, the content of which is hereby incorporated by reference in its entirety.

BACKGROUND

The modern abundance of publicly available data from sources such as web sites, blogs, and various other online experiences cannot be overstated. Indeed, there exists a significant lack of and ever-growing need for even greater abilities to process such data in meaningful ways so as to provide a user with opportunities to do more than mere keyword searches or similar actions. Current systems offer limited use of information within public data, for example, and generally provide a user with little more than typical search engine functionality.

There remains a need for a way to address these and other problems associated with the prior art. More particularly, there remains a need for greater leveraging of data, such as public data, particularly with regard to unstructured data.

DETAILED DESCRIPTION

The disclosed technology relates generally to data processing, query processing, and more particularly but not exclusively to systems and methods for processing document and text data. For example, knowledge may be harvested from unstructured data and subsequently relied on or used to provide a user with meaningful information that ties together multiple pieces of data from any of a number of public data sources.

Figure 1:
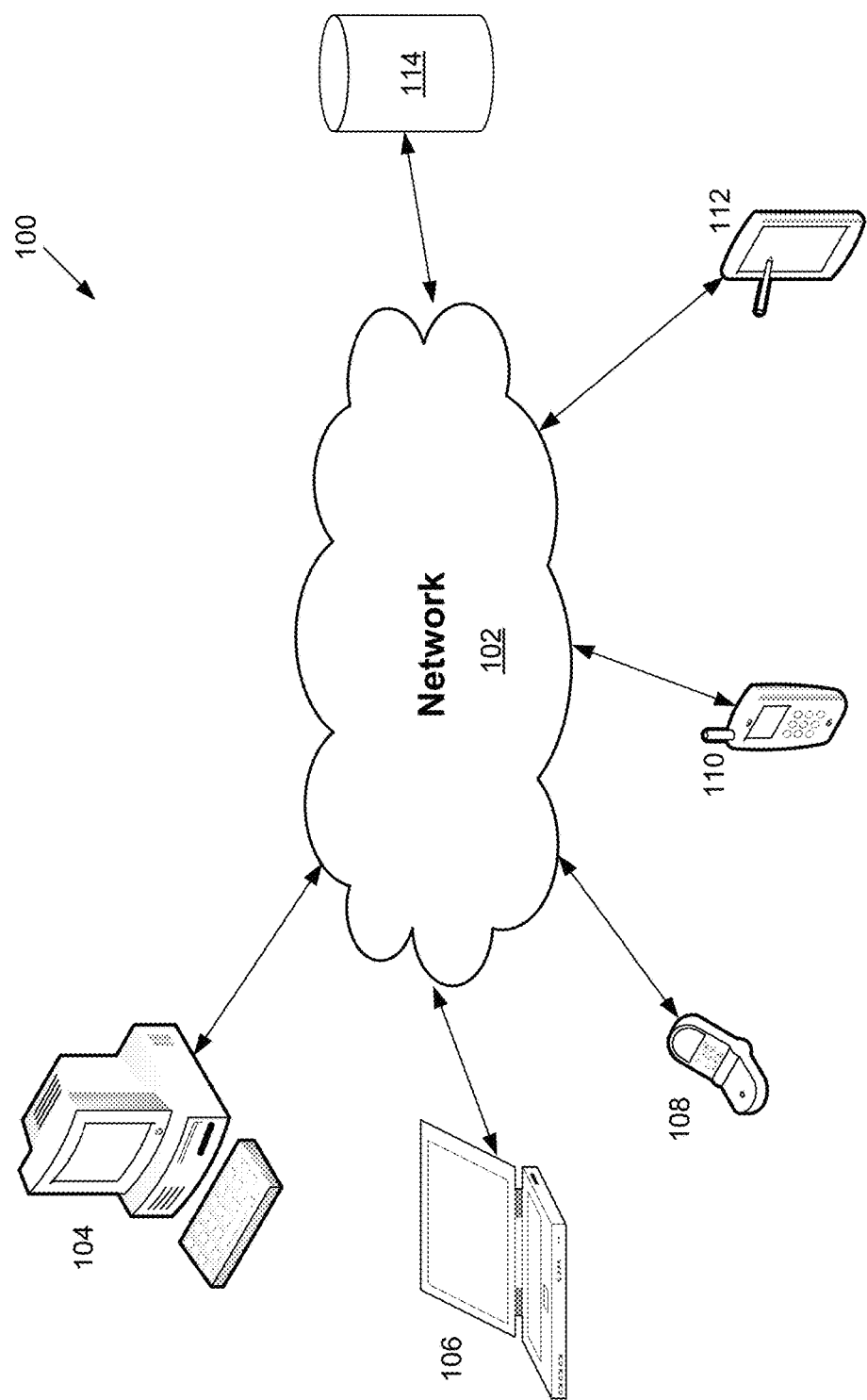
FIG. 1 is a block diagram illustrating an example of a networked system in which embodiments of the disclosed technology may be implemented.

FIG. 1 is a block diagram illustrating an example of a networked system 100 in which embodiments of the disclosed technology may be implemented. In the example, the system 100 includes a network 102 such as the Internet, an intranet, a home network, or any combination thereof. Traditional computing devices such as a desktop computer 104 and laptop computer 106 may connect to the network 102 to communicate with each other or with other devices connected to the network.

The networked system 100 also includes three mobile electronic devices 108-112. Two of the mobile electronic devices, 108 and 110, are mobile communications devices such as cellular telephones or smart phones. The third mobile electronic device, 112, is a handheld device such as a personal data assistant (PDA) or tablet device.

The networked system 100 also includes a storage device 114, which may be a central database or repository, a local data store, or a remote storage device, for example. The storage device 114 may be accessible to any or all of the other devices 104-112, subject to limitations or restrictions by the devices 104-112, a third party, or the storage device 114 itself. The storage device 114 may be used to store some or all of the public data that is accessed and/or used by any of the computers 104 and 106 or mobile electronic devices 108-112. In situations involving personal data, the storage device 114 may also store any or all of the personal data accessed and/or used by any of the computers 104 and 106 or mobile electronic devices 108-112.

Figure 2:
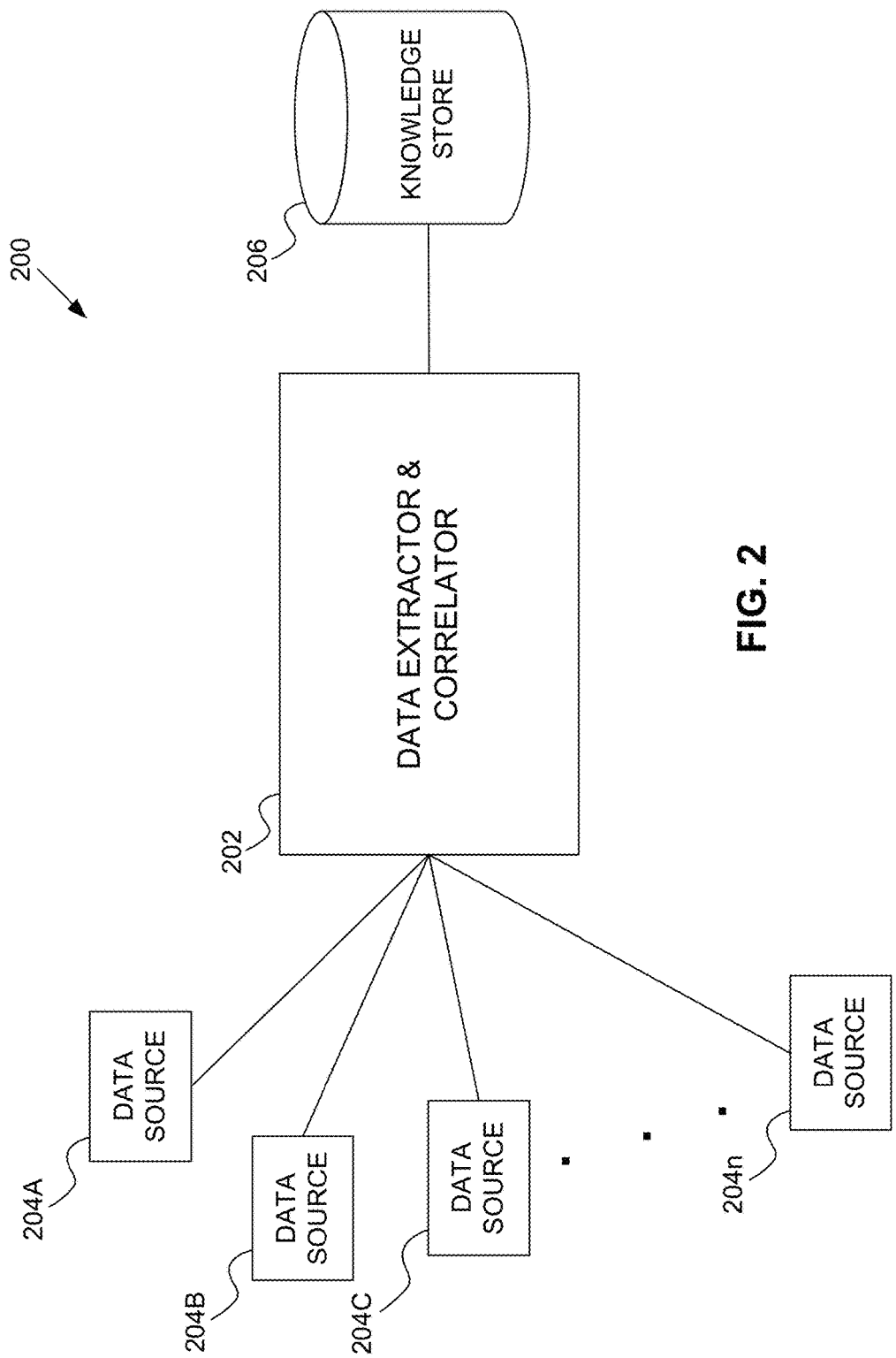
FIG. 2 is a block diagram illustrating an example of a system implementing a data extractor and correlator in accordance with certain embodiments of the disclosed technology.

FIG. 2 is a block diagram illustrating an example of a system 200 implementing a machine-implemented data extractor and correlator 202 in accordance with certain embodiments of the disclosed technology. In the example, the data extractor and correlator 202 is configured to retrieve public data from any of a number of public data sources 204A-n. The public data sources 204A-n may include, but are not limited to, websites, blogs, and other types of online content or experiences.

The system 200 also includes a knowledge store 206 configured to store knowledge, generally in the form of structured data. As used herein, the term structured data generally refers to data or information that is identifiable because it is organized in a structure. Structured data is typically searchable by data type within content, readily understood by computing devices, and efficiently organized for human readers. Structured data as described herein can generally be used to identify a person, place, or item involved with a particular field or industry.

Structured data is usually organized in such a way that it is readily and often easily searchable, presentable, or useable by an application or user. In contrast, the term unstructured data as used herein generally refers to data that has no identifiable structure. Unstructured data may include content that is similar or even identical to corresponding structured data but is not organized in such a way that it is readily or easily searchable, presentable, or useable by an application or user.

The data extractor and correlator 202 is configured to retrieve public data from at least one of the public data sources 204A-n. For example, the data extractor and correlator 202 may be configured to retrieve all new blog postings or newly-posted content on a certain website. Alternatively or in addition thereto, the data extractor and correlator 202 may retrieve all online documents that may be of interest the user. A functional or actual filter may be used to specify that only certain items, e.g., pieces of information pertaining to products purchased online or placed on a wish list by the user, are to be retrieved by the data extractor and correlator 202.

The data extractor and correlator 202 is further configured to extract information from unstructured data within the retrieved public data. For example, a blog posting retrieved from the data extractor and correlator 202 may contain unstructured data such as freeform text. In such a situation, the data extractor and correlator 202 may extract certain words, terms, or phrases from the unstructured data within the blog entry.

The data extractor and correlator 202 is further configured to correlate the extracted information with previously stored structured data, e.g., stored in the knowledge store 206, to generate additional structured data. For example, consider a situation in which the data extractor and correlator 202 extracts additional information, e.g., a publicly available secondary phone number pertaining to a contact having corresponding information, e.g., a name and a publicly available primary phone number, that is already stored in the knowledge store 206. The extracted information (secondary phone number) will be correlated with the previously stored structured data (existing name and primary phone number) to generate additional structured data (secondary phone number added to or associated with the existing contact).

The knowledge store 206 is configured to store additional structured data as well as previously stored structured data. The data extractor and correlator 202 thus provides output in the form of enriched knowledge that may be stored within the storage device 206 and used in subsequent queries or applications by the user or other users or even other applications. For example, in the situation described above, a subsequent query by a user involving the contact may provide the secondary phone number without the user needing to perform an additional or more detailed search for the information.

Table 1 provides an example of different types of structured data that may be extracted from various types of public data sources.

TABLE 1

| Public Data Source Type | Extracted Structured Data (Potential) |
| --- | --- |
| Website (e-commerce) | Items purchased, items placed on wish list, items viewed, items reviewed, items shared, description of item(s), trends |
| Website (informational, e.g., Wikipedia) | Definitions, statistics, attributes, history, benchmarks, historical references, links |
| Weblog posting or other online blog entry | Name, Company, Title, username, email, URL, IM ID, Chat ID |
| Publicly available documents and document stores | Last modified time, meta data, header, footer, copyright information, title, author, shared access list |

Table 2 provides an example illustrating how the data extractor and correlator 202 of FIG. 2 may analyze and correlate structured data and convert it into enriched knowledge.

TABLE 2

| Structured Data | Enriched Knowledge |
| --- | --- |
| Blog posting by user TDG1 | Username: TDG1<br>Characteristics: main topic of the blog, general subject area, information about the posting author, e.g., from his or her personal webpage, Wikipedia entry, etc.<br>Group Members: Information extracted based on other users |

TABLE 2-continued

| Structured Data | Enriched Knowledge |
| --- | --- |
| | posting comments on the blog posting.<br>Information Co-relation and Consolidation: Usernames and other publicly available information is co-related and consolidated. |

Certain embodiments of the system 200 of FIG. 2 further include a machine-implemented document harvester configured to retrieve one or more documents from at least one of the public data sources 204A-n. Such embodiments may further include a machine-implemented document indexer configured to index a plurality of documents harvested by the document harvester from the public data sources 204A-n.

A document harvester and indexer may be used to process and index documents including files and web pages. These documents may be retrieved locally from a user's computer and/or remotely from network storage, e.g., a server that stores documents produced by a plurality of users, as well as from the Web, e.g., from web pages via Web application programming interfaces (APIs). The documents may also be tagged and/or clustered.

As documents are harvested, a word popularity dictionary may be created. Word popularity generally refers to a global dictionary containing high frequency words and weights. When a new document is harvested, for example, keywords that do not exist in the dictionary may be added. Stemming may be applied to obtain root words and text may be converted to lowercase. As a user interacts with the system by visiting web pages or accessing publicly available documents, for example, the weights in the dictionary can be constantly updated. Keywords in frequently-accessed websites may be given higher weights while keywords in less-important websites may be given lower weights. Consequently, an up-to-date and accurate model of the user's universe and behavior may be effectively constructed.

Figure 3:
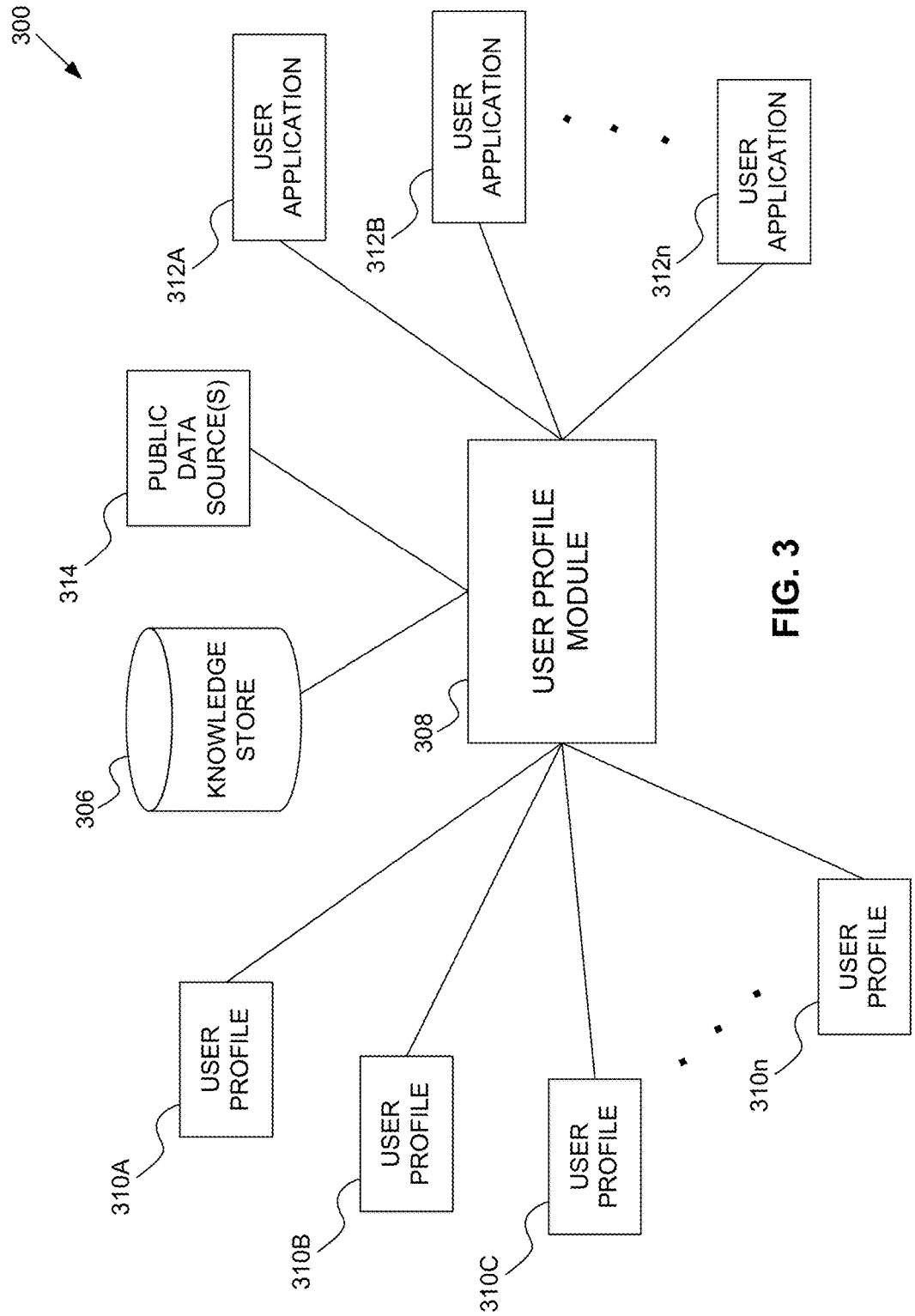
FIG. 3 is a block diagram illustrating an example of a system implementing a user profile module in accordance with certain embodiments of the disclosed technology.

FIG. 3 is a block diagram illustrating an example of a system 300 that includes a machine-implemented user profile module 308 in accordance with certain embodiments of the disclosed technology. Such embodiments are particularly beneficial for applications that aim to adapt to a user by better tailoring to his or her specific needs and preferences.

In the example, the user profile module 308 is configured to interact with any number of user profiles 310A-n. Each user profile may correspond to one or more users. Also, any given user may be associated with multiple user profiles. For example, each user profile may correspond to a certain role, e.g., sales coordinator, that may be assigned to or associated with multiple users. Multiple user profiles 310A-n may correspond to a user's particular situation. For example, a user may have one user profile 310A for work-related items and a second user profile 310B for home-related items. Alternatively or in addition thereto, a user may have one or more profiles that correspond to activities with friends, one or more profiles that correspond to family activities, and one or more profiles that correspond to business-related events.

The user profile module 308 may interact with a knowledge store 306 such as the knowledge store 206 of FIG. 2, for example. The user profile module 308 may also interact with any of a number of user applications 312A-n such as a sales-oriented application, for example. In certain embodiments, a user's experience with a certain user application may be influenced or even driven by one or more of the user profiles 310A-n. For example, if the user is interacting with user application 312B concerning a particular sale of an item involving information associated with user profile 310C, the user profile module 308 may direct the user application 312B to proactively provide certain information, e.g., certain contact information stored within the knowledge store 306, to the user.

In certain embodiments, the user profile module 308 may interact with one or more public data sources 314. For example, the user profile module 308 may proactively seek or passively receive public information pertaining to a contact whose publicly available contact information is stored by the knowledge store 306. If the new public information is different than the previously stored information, the user profile module 308 may direct the knowledge store 306 and/or one or more of the user profiles 310A-n to update the corresponding information accordingly.

Figure 4:
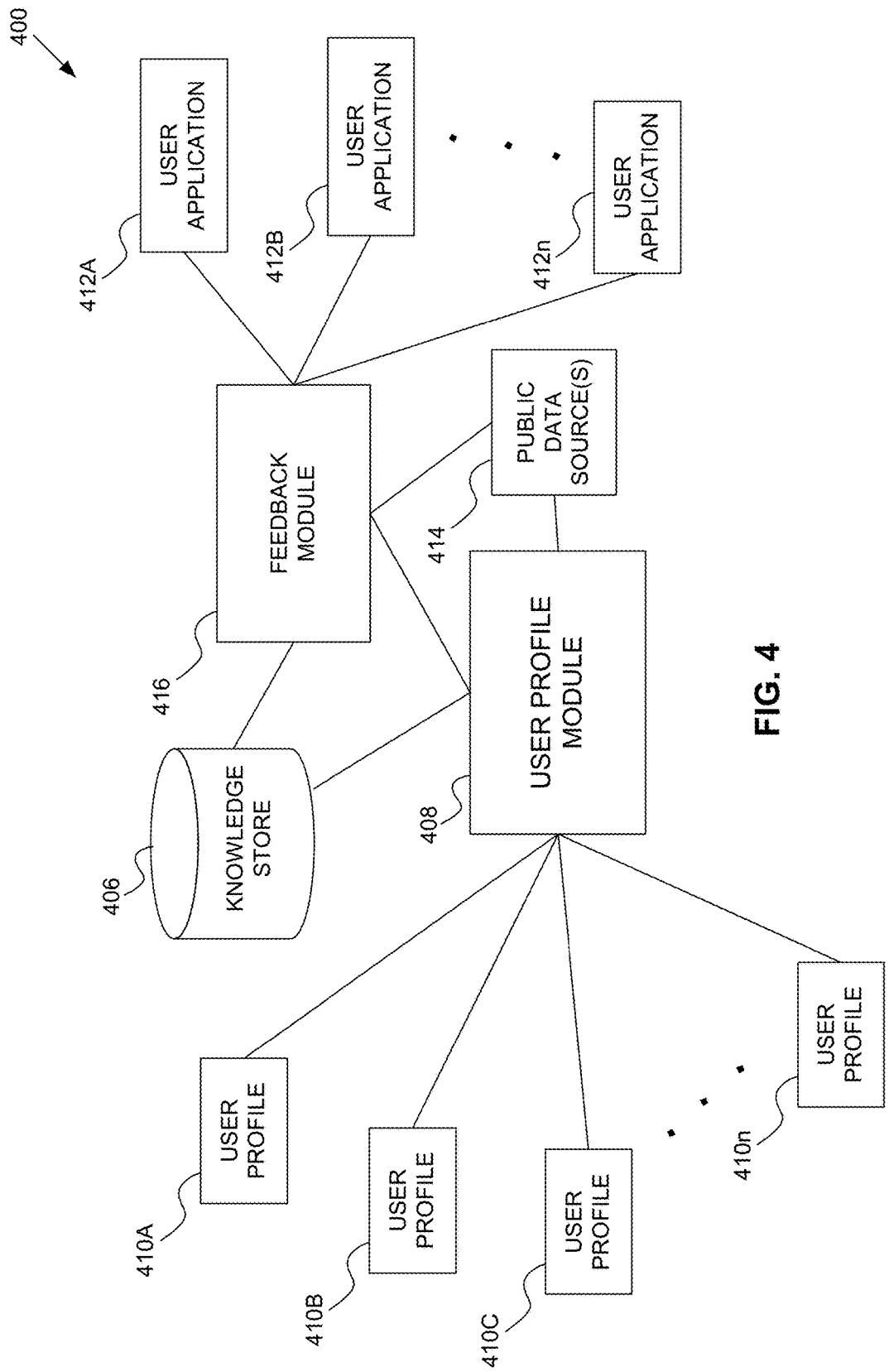
FIG. 4 is a block diagram illustrating an example of a system implementing a feedback module in accordance with certain embodiments of the disclosed technology.

FIG. 4 is a block diagram illustrating an example of a system 400 implementing a feedback module 416 in accordance with certain embodiments of the disclosed technology. In the example, the system 400 includes a user profile module 408, such as the user profile module 308 of FIG. 3, configured to interact with one or more user profiles 410A-n, such as the user profiles 310A-n of FIG. 3. The user profile module 408 is also configured to interact with a knowledge store 406 such as the knowledge store 206 of FIG. 2, for example.

The feedback module 416 may interact with one or both of the user profile module 408 and the knowledge store 406. In certain embodiments, the feedback module 416 may interact with one or more public data source 414 and may cause the user profile module 408 to alter or update one or more of the user profiles 410A-n based on interactions with the public data source(s) 414. In certain embodiments, the feedback module 416 may interact directly with a user associated with one of the user profiles 410A-n. Alternatively or in addition thereto, the feedback module 416 may interact directly with one or more user applications 412A-n, such as the user applications 312A-n of FIG. 3.

Consider a situation in which user profile 410B involves a particular contact whose publicly available contact information just changed and is broadcast via the public data source 414. The feedback module 416 may direct the user profile module 408 to update one or more of the user profiles 410A-n with the new public information concerning the contact. The user profiles 410A-n can be continually updated and enriched as more searches are conducted and in an increasingly refined manner. For example, suggestions provided to a user based on his or her user profile(s) may be increasingly relevant as time goes on.

In embodiments where the feedback module 416 interacts with one or more user applications 412A-n, the feedback module 416 may be triggered to direct the user profile module 408 to update one or more of the user profiles 410A-n responsive to the interaction with the user application(s) 412A-n. For example, if the feedback module 416 detects a user updating a contact mailing address in user application 412B, the feedback module 416 may direct the user profile module 408 to update any of the user profiles 410A-n that include a mailing address for the contact.

Figure 5:
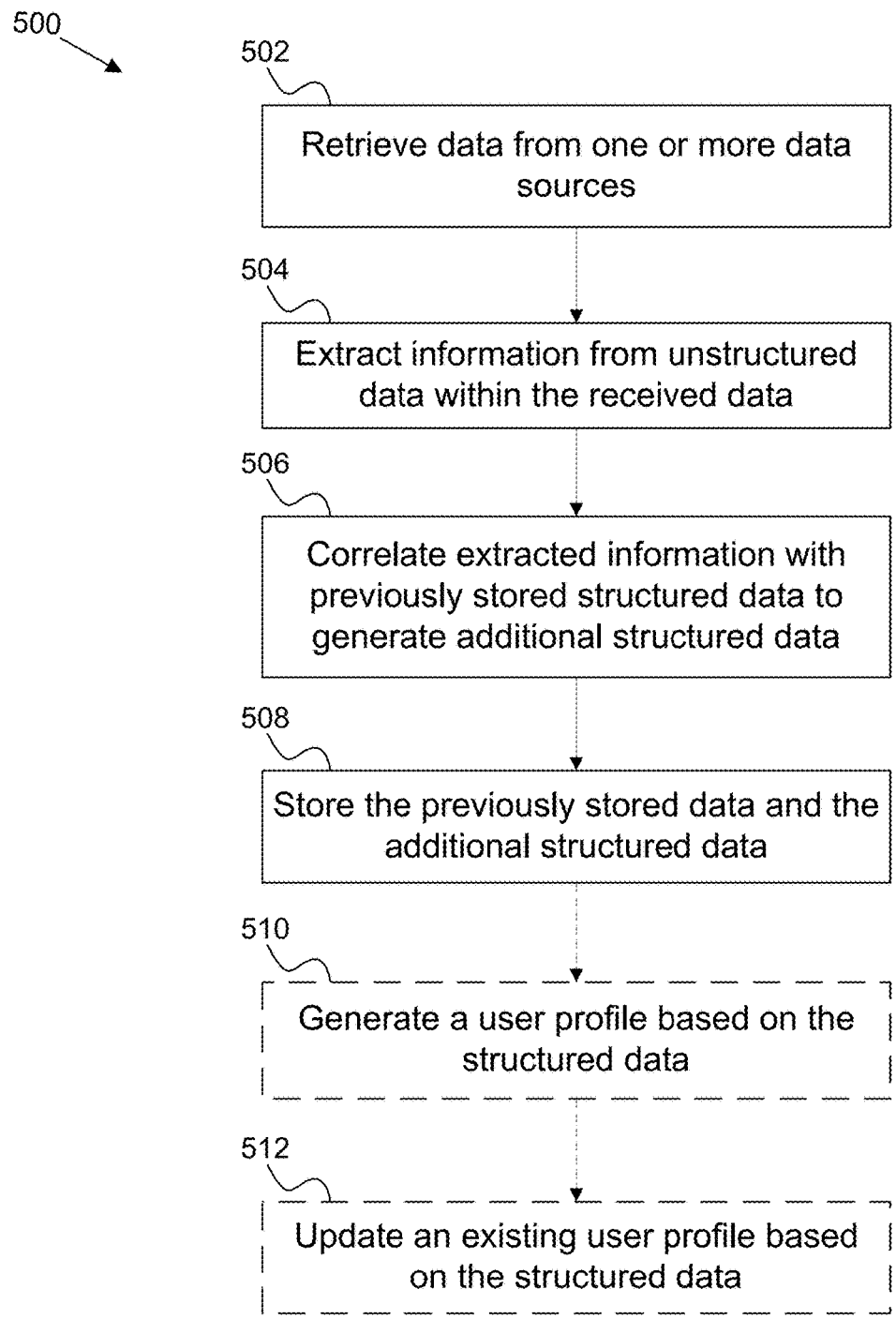
FIG. 5 is a flowchart illustrating an example of a machine-implemented method in accordance with certain embodiments of the disclosed technology.

FIG. 5 is a flowchart illustrating an example of a machine-implemented method 500 in accordance with certain embodiments of the disclosed technology. At 502, data is retrieved from one or more data sources. For example, a machine-implemented data extractor and correlator, such as the data extractor and correlator 202 of FIG. 2, may retrieve public data from one or more public data sources, such as the public data sources 204A-n of FIG. 2.

At 504, information is extracted from unstructured data within the data retrieved at 502. For example, a data extractor and correlator, such as the data extractor and correlator 202 of FIG. 2, may extract information pertaining to a public posting listing a contact name. Such information may be unstructured in that it is neither organized in a structured manner nor readily classifiable or useable without modification or organizing. For example, the information may be a free-text piece of data such as a blog posting.

The information extraction performed at 504 may be accomplished by breaking at least one sentence into subject, verb, and object (SVO), extracting phrases that link a subject to an object, extracting at least one word in close proximity to an identified feature or service, extracting at least one word in close proximity to a known quality, or any combination thereof. Features with certain quality or derived quality ratings may be tagged for reviews, for example. Also, structures that approximate concepts from documents with and without prior semantic understanding may be constructed.

At 506, some or all of the extracted information is correlated with previously stored structured data to generate additional structured data. For example, a data extractor and correlator, such as the data extractor and correlator 202 of FIG. 2, may correlate the contact name discussed above with an existing order and/or contact having associated structured data stored within a knowledge store, such as the knowledge store 206 of FIG. 2. The knowledge store may store both the additional structured information and the previously stored structured data as indicated at 508.

In certain embodiments, the retrieved data includes supplemental structured data, e.g., structured data that has not yet been stored within a knowledge store. In these situations, the data extractor and correlator may correlate the supplemental structured data with one or both of the previously stored structured data and the additional structured data to generate further structured data that may be stored by the knowledge store.

In certain embodiments, a user profile, such as the user profiles 310A-n of FIG. 3, may be generated based at least in part on one or both of the previously stored structured data and the additional structured data, as indicated at 510. Alternatively or in addition thereto, an existing user profile may be updated based at least in part on one or both of the previously stored structured data and the additional structured data, as indicated at 512. Generation and modification of user profiles may be performed by a user profile module, such as the user profile module 308 of FIG. 3.

Figure 6:
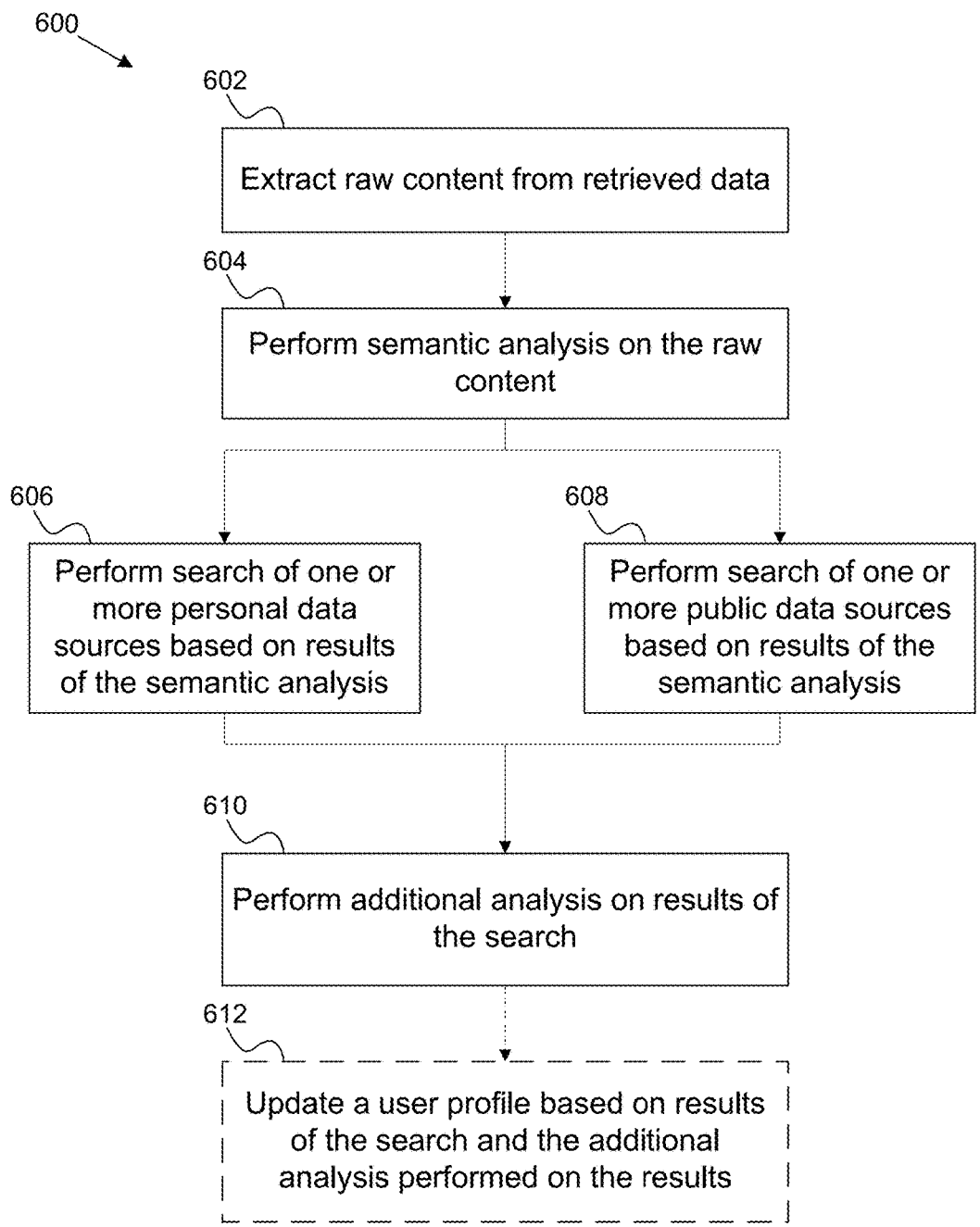
FIG. 6 is a flowchart illustrating an example of another machine-implemented method in accordance with certain embodiments of the disclosed technology.

FIG. 6 is a flowchart illustrating an example of another machine-implemented method 600 in accordance with certain embodiments of the disclosed technology. At 602, raw content is extracted from retrieved data, such as the personal and/or public data retrieved at 502 of FIG. 5.

At 604, semantic analysis is performed on the raw content. For example, a semantic analysis module may be configured to determine semantic information based on unstructured data within the retrieved data. A data extractor and correlator, such as the data extractor and correlator 202 of FIG. 2, may be configured to correlate the extracted information with previously stored structured data based at least in part on the semantic information.

Certain embodiments include performing a search of one or more data sources based on results of the semantic analysis performed at 604. Such embodiments may include performing a search of one or more personal data sources, as indicated by 606, or performing a search of one or more public data sources, as indicated by 608.

At 610, an additional analysis is performed based at least in part on the results of the search performed at either 606 or 608. In certain embodiments, a user profile, such as the user profiles 310A-n of FIG. 3, may be updated, e.g., by a user profile module, based on one or both of the results of the search performed at either 606 or 608 and the additional analysis performed at 610. The additional analysis performed at 610 may include an inference analysis, a topic analysis, information tagging, information clustering, or some combination thereof. Probabilistic links may also be created based on the additional analysis. Over time, topics may be augmented, merged, deleted, or split depending on the analysis. Also, sub-topics may be created based on the analysis.

Figure 7:
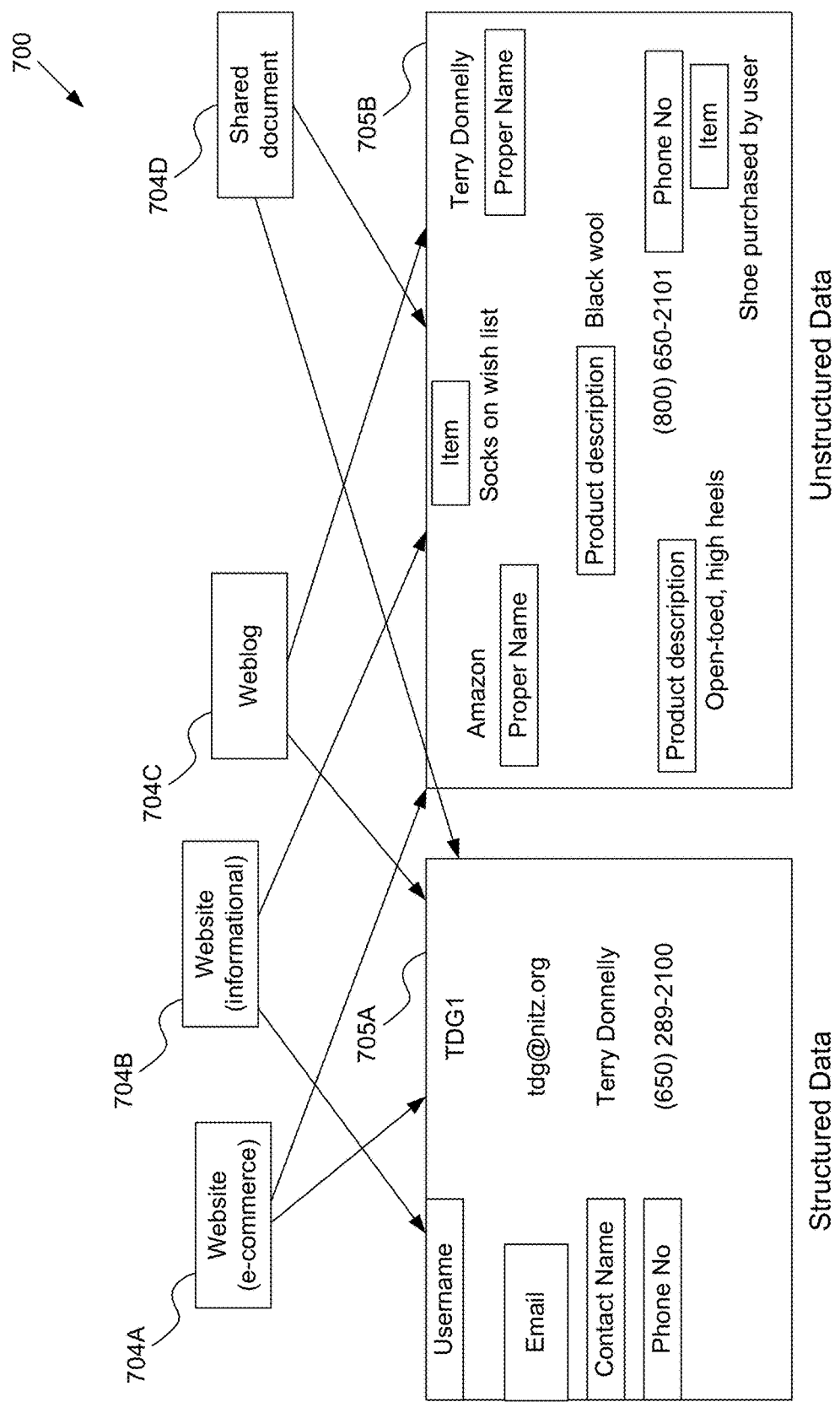
FIG. 7 is a block diagram illustrating an example of a system involving structured data and unstructured data retrieved from multiple data sources in accordance with certain embodiments of the disclosed technology.

FIG. 7 is a block diagram illustrating an example of a system 700 involving structured data 705A and unstructured data 705B retrieved from multiple data sources in accordance with certain embodiments of the disclosed technology. In the example, the data sources include multiple public data sources 704A-D: a first website 704A pertaining more to e-commerce activities, a second website 704B pertaining more to dissemination of information, a weblog 704C, and a shared document or file 704D.

In the example, the data sources 704A-D collectively yield multiple pieces of structured data 705A that may be retrieved, for example, by a data extractor and correlator: contact information (name and email address), username, and publicly available phone number. The data sources 704A-D also provide various pieces of unstructured data 705B: two proper names (person and company), a publicly available phone number, and information pertaining to multiple items that were purchased and/or wish-listed by the user.

Certain information from the unstructured data 705B may be correlated with the structured data 705A. Such correlation may include identifying, extracting, or building at least one relationship between the extracted information and previously stored structured data. For example, one or more features identified within the extracted information may be tagged or otherwise marked for subsequent operations. Parts of speech analysis may also be performed and then enriched by relationship determinations.

In certain embodiments, correlation and relationship building may include categorizing one or more portions of the unstructured data. Portions of the unstructured data 705B may each be broken into subject, verb, and object (SVO). Phrases linking a subject to an object may be extracted. A determination may be made as to certain words in close proximity to an identified feature or service, known quality, or any combination thereof.

Consider an example in which the word "Apple" in unstructured free-flowing data could have multiple meanings. The word could refer to a fruit, the name of a company, the name of a person, etc. Relationships may be established to decipher the meaning of certain unstructured data. A possible association to each of these entities can be created and those that have a high probability based on parts of speech analysis and entity relationship identification, for example, may be strengthened. In the present example, an inference may be made that "Apple" is a company based on its learning from a prior structured data analysis. Table 3 provides an indication as to the relationships for "Apple" that may be identified from structured data. In the example, the word "Apple" occurs along with "Apple Thomas" and "Rob Cramer."

TABLE 3

| Structured Data | Relationship Identification |
|---|---|
| Apple in Apple Thomas | First name of an person |
| Apple | Company or business entity name |
| Apple Thomas | Name of an person |
| Rob Cramer | Name of a person |

Figure 8:
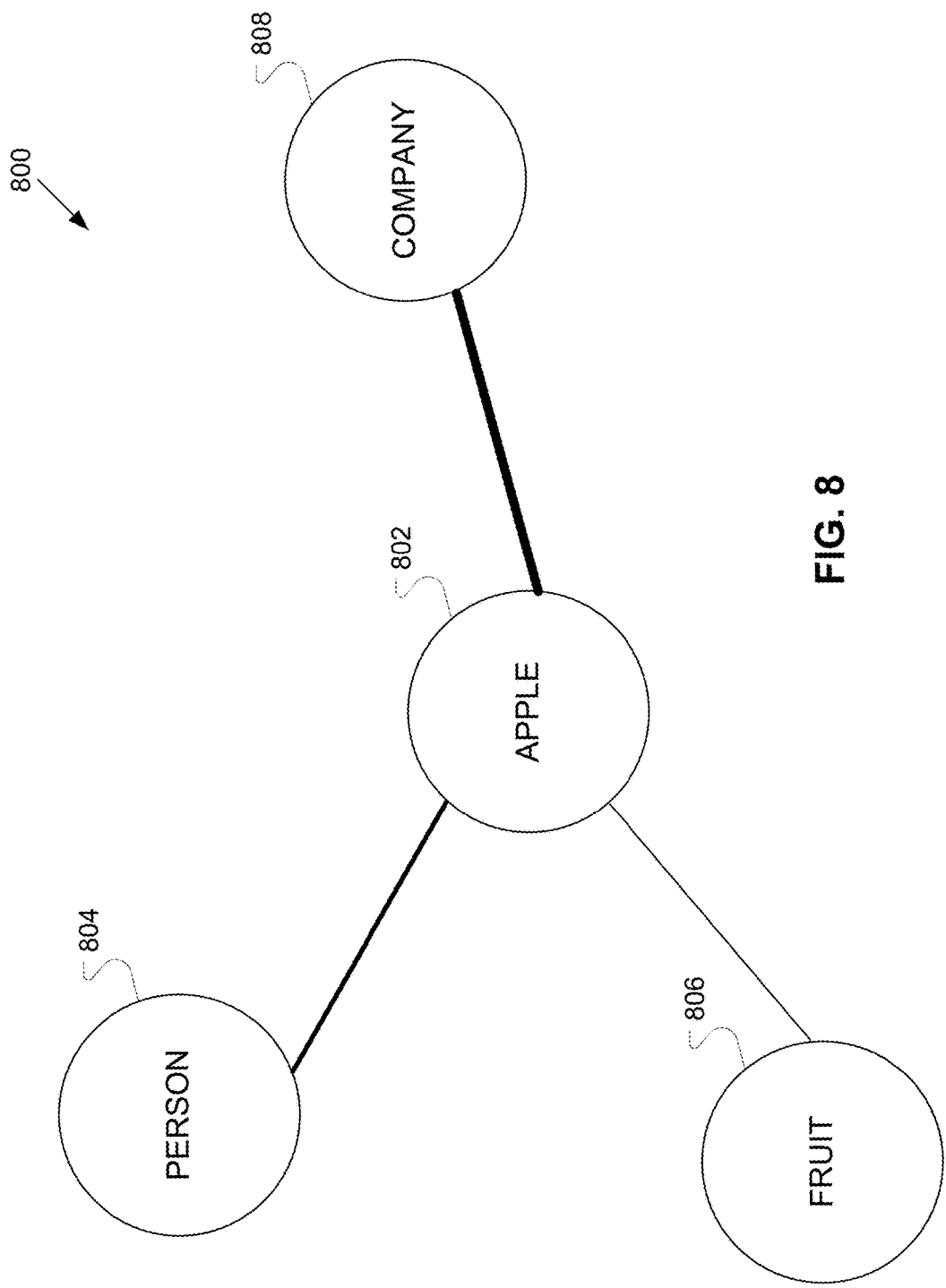
FIG. 8 illustrates an example that shows possible relationships between the word "Apple" and various types of entities that may be defined.

FIG. 8 illustrates an example 800 that shows the possible relationships that may be defined between the word "Apple" 802, as discovered in unstructured data, and the various types of entities, e.g., a person 804, a fruit 806, or a company 808, as discussed above. As indicated visually in the figure by the different thicknesses of the connecting lines, the word "Apple" as identified in the unstructured data has been determined to refer to a company name and not to a fruit or a person based on the relative strength of the determined relationship therebetween.

In certain embodiments, one or more patterns may be extracted or determined from structured data, such as previously stored structured data, to create pattern fingerprints. Patterns may subsequently be extracted from the unstructured data using these pattern fingerprints. For example, structured data may be used to construct a pattern fingerprint knowledge base and then use the pattern fingerprinting knowledge to recognize similar items from unstructured data and establish their relationship with various entities. For example, fingerprint data patterns can be learned and determined for items purchased and/or wishlisted by a user. These learnings may be applied to identify similar patterns in unstructured data and identify additional relationships between entities.

Certain implementations of the disclosed technology may include personalized searching capabilities and features, personalized content delivery, personalized advertisement delivery, intelligence gathering and analysis, and automated augmentation of knowledge bases.

Embodiments of the disclosed technology may be implemented as machine-directed methods or physical devices. Accordingly, certain implementations may take the form of an entirely-hardware embodiment, an entirely-software embodiment, or an embodiment combining both hardware and software aspects. For example, some or all of the components for any given embodiment may be computer-implemented components.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

What is claimed is:

1. A computer-implemented method comprising:
   determining, by a feedback module of a computing device, that unstructured data associated with a public data source on a network has been changed, wherein the change was broadcast using the public data source, and wherein the computing device is on the network;
   extracting information from the unstructured data, wherein the extracted information is associated with the change, wherein extracting includes breaking the unstructured data into one or more parts, wherein the one or more parts include a type of information associated with a feature, and wherein the type of information is in close proximity to the feature;
   determining that the extracted information is related to user profiles, wherein a user profile is associated with a use of the network, wherein determining includes correlating the type of information associated with the feature to structured data associated with the user profiles;
   generating, by a user profile module of the computing device, new structured data using the type of information associated with the feature; and
   modifying the user profiles, wherein modifying includes using the new structured data, and wherein modifying a user profile modifies a use of the network associated with the user profile.

2. The computer-implemented method of claim 1, wherein a user profile directs an application on the network to proactively provide information associated with the application.

3. The computer-implemented method of claim 1, wherein the user profile directs an application on the network to proactively provide information stored in a knowledge store.

4. The computer-implemented method of claim 1, further comprising:
   detecting an update of information in a user application; and
   modifying the user profiles to include the updated information.

5. The computer-implemented method of claim 1, further comprising:
   generating a new user profile, wherein the new user profile is generated using previously stored structured data.

6. The computer-implemented method of claim 1, further comprising:
   tagging the feature, wherein the tag is used to correlate the type of information associated with the feature to the structured data associated with the user profiles.

7. The computer-implemented method of claim 1, further comprising:
   determining a pattern associated with previously stored structured data; and
   using the pattern to identify a similar pattern in the unstructured data.

8. The computer-implemented method of claim 1, wherein the type of information includes a word, a phrase, a trend, an attribute, a statistic, a reference, a network identifier, an account identifier, a time, metadata, or an access list.

9. A computing device, comprising:
   one or more processors; and
   a non-transitory computer-readable medium including instructions that, when executed by the one or more processors, cause the one or more processors to perform operations including:
   determining, by a feedback module of the computing device, that unstructured data associated with a public data source on a network has been changed, wherein the change was broadcast using the public data source, and wherein the computing device is on the network;
   extracting information from the unstructured data, wherein the extracted information is associated with the change, wherein extracting includes breaking the unstructured data into one or more parts, wherein the one or more parts include a word associated with a feature, and wherein the word is in close proximity to the feature;
   determining that the extracted information is related to user profiles, wherein a user profile is associated with a use of the network, wherein determining includes correlating the word associated with the feature to structured data associated with the user profiles;
   generating, by a user profile module of the computing device, new structured data using the word associated with the feature; and
   modifying the user profiles, wherein modifying includes using the new structured data, and wherein modifying a user profile modifies a use of the network associated with the user profile.

10. The computing device of claim 9, wherein a user profile directs an application on the network to proactively provide information associated with the application.

11. The computing device of claim 9, wherein the user profile directs an application on the network to proactively provide information stored in a knowledge store.

12. The computing device of claim 9, wherein the non-transitory computer-readable medium further includes instructions that, when executed by the one or more processors, cause the one or more processors to perform operations including:
   detecting an update of information in a user application; and
   modifying the user profiles to include the updated information.

13. The computing device of claim 9, wherein the non-transitory computer-readable medium further includes instructions that, when executed by the one or more processors, cause the one or more processors to perform operations including:
   generating a new user profile, wherein the new user profile is generated using previously stored structured data.

14. The computing device of claim 9, wherein the non-transitory computer-readable medium further includes instructions that, when executed by the one or more processors, cause the one or more processors to perform operations including:
   tagging the feature, wherein the tag is used to correlate the word associated with the feature to the structured data associated with the user profiles.

15. The computing device of claim 9, wherein the non-transitory computer-readable medium further includes instructions that, when executed by the one or more processors, cause the one or more processors to perform operations including:

determining a pattern associated with previously stored structured data; and using the pattern to identify a similar pattern in the unstructured data.

16. The computing device of claim 9, wherein the type of information includes a word, a phrase, a trend, an attribute, a statistic, a reference, a network identifier, an account identifier, a time, metadata, or an access list.

17. A computer-program product tangibly embodied in a non-transitory machine-readable storage medium, including instructions that, when executed by one or more processors, cause the one or more processors to:

determine, by a feedback module of a computing device, that unstructured data associated with a public data source on a network has been changed, wherein the change was broadcast using the public data source, and wherein the computing device is on the network;

extract information from the unstructured data, wherein the extracted information is associated with the change, wherein extracting includes breaking the unstructured data into one or more parts, wherein the one or more parts include a word associated with a feature, and wherein the word is in close proximity to the feature;

determine that the extracted information is related to user profiles, wherein a user profile is associated with a use of the network, wherein determining includes correlating the word associated with the feature to structured data associated with the user profiles;

generate, by a user profile module of the computing device, new structured data using the word associated with the feature; and modify the user profiles, wherein modifying includes using the new structured data, and wherein modifying a user profile modifies a use of the network associated with the user profile.

18. The computer-program product of claim 17, wherein a user profile directs an application on the network to proactively provide information associated with the application.

19. The computer-program product of claim 17, wherein the user profile directs an application on the network to proactively provide information stored in a knowledge store.

20. The computer-program product of claim 17, further comprising instructions that, when executed by the one or more processors, cause the one or more processors to:

detect an update of information in a user application; and modify the user profiles to include the updated information.

21. The computer-program product of claim 17, further comprising instructions that, when executed by the one or more processors, cause the one or more processors to:

generate a new user profile, wherein the new user profile is generated using previously stored structured data.

22. The computer-program product of claim 17, further comprising instructions that, when executed by the one or more processors, cause the one or more processors to:

tag the feature, wherein the tag is used to correlate the word associated with the feature to the structured data associated with the user profiles.

23. The computer-program product of claim 17, further comprising instructions that, when executed by the one or more processors, cause the one or more processors to:

determine a pattern associated with previously stored structured data; and use the pattern to identify a similar pattern in the unstructured data.

24. The computer-program product of claim 17, wherein the type of information includes a word, a phrase, a trend, an attribute, a statistic, a reference, a network identifier, an account identifier, a time, metadata, or an access list.

* * * * *